United States Patent
Mizuno

(10) Patent No.: US 10,971,307 B2
(45) Date of Patent: Apr. 6, 2021

(54) MULTI-LAYER CERAMIC CAPACITOR AND METHOD OF PRODUCING A MULTI-LAYER CERAMIC CAPACITOR

(71) Applicant: TAIYO YUDEN CO., LTD., Tokyo (JP)

(72) Inventor: Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/159,182

(22) Filed: Oct. 12, 2018

(65) Prior Publication Data

US 2019/0131074 A1 May 2, 2019

(30) Foreign Application Priority Data

Oct. 26, 2017 (JP) ................. 2017-206830

(51) Int. Cl.
| | |
|---|---|
| *H01G 4/30* | (2006.01) |
| *H01G 4/008* | (2006.01) |
| *H01G 4/224* | (2006.01) |
| *H01G 4/12* | (2006.01) |
| *H01G 4/012* | (2006.01) |

(52) U.S. Cl.
CPC ............... *H01G 4/30* (2013.01); *H01G 4/008* (2013.01); *H01G 4/0085* (2013.01); *H01G 4/012* (2013.01); *H01G 4/12* (2013.01); *H01G 4/224* (2013.01); *H01G 4/1227* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224
See application file for complete search history.

(56) References Cited

U.S. PATENT DOCUMENTS

| | | | |
|---|---|---|---|
| 2012/0073129 A1 | 3/2012 | Abe et al. | |
| 2017/0018363 A1* | 1/2017 | Tanaka | ............ H01G 4/30 |
| 2018/0061575 A1* | 3/2018 | Mizuno | ............ H01G 4/008 |

FOREIGN PATENT DOCUMENTS

JP 2012-094819 A 5/2012

* cited by examiner

*Primary Examiner* — Michael P McFadden
(74) *Attorney, Agent, or Firm* — Saliwanchik, Lloyd & Eisenschenk

(57) ABSTRACT

A multi-layer ceramic capacitor includes a multi-layer unit, a side margin, and a bonding unit. The multi-layer unit includes ceramic layers that are laminated in a first direction, and internal electrodes that are disposed between the ceramic layers and include a base metal material as a main component. The side margin includes ceramics as a main component and covers the multi-layer unit from a second direction orthogonal to the first direction. The bonding unit is disposed between the multi-layer unit and the side margin, the bonding unit having a maximum dimension in the first direction and being made of an oxide including the base metal material, the maximum dimension being equal to or larger than 50% of an average dimension of the ceramic layers in the first direction.

8 Claims, 13 Drawing Sheets

MULTI-LAYER CERAMIC CAPACITOR AND METHOD OF PRODUCING A MULTI-LAYER CERAMIC CAPACITOR

CROSS-REFERENCE TO RELATED APPLICATION

This application claims the benefit under 35 U.S.C. § 119 of Japanese Patent Application No. 2017-206830, filed Oct. 26, 2017, the entire contents of which are incorporated herein by reference.

BACKGROUND

The present disclosure relates to a multi-layer ceramic capacitor including side margins.

There is known a technique of providing side margins in a method of producing a multi-layer ceramic capacitor, the side margins protecting the periphery of internal electrodes. For example, Japanese Patent Application Laid-open No. 2012-94819 (hereinafter referred to as Patent Document 1) discloses a multi-layer ceramic capacitor including a multi-layer unit and ceramic side surface layers, the multi-layer unit including internal electrodes exposed to the side surfaces of the multi-layer unit, the ceramic side surface layers serving as side margins and provided to the side surfaces of the multi-layer unit.

SUMMARY

In the case where the side margins (ceramic side surface layers) are provided to the side surfaces of the multi-layer unit as disclosed in Patent Document 1, sintering behavior is different between the internal electrodes made of a metal material and the side margins during sintering, and stress is generated between the multi-layer unit and each side margin in a direction moving away from each other. For that reason, a crack or peel-off is likely to be generated in the bonded interface of the side margin, and thus a technique capable of inhibiting such defects is expected.

In view of the circumstances as described above, it is desirable to provide a multi-layer ceramic capacitor and a method of producing the same, which are capable of inhibiting a crack or peel-off from being generated in a bonded interface of a side margin.

According to an embodiment of the present disclosure, there is provided a multi-layer ceramic capacitor including a multi-layer unit, a side margin, and a bonding unit.

The multi-layer unit includes ceramic layers that are laminated in a first direction, and internal electrodes that are disposed between the ceramic layers and include a base metal material as a main component.

The side margin includes ceramics as a main component and covers the multi-layer unit from a second direction orthogonal to the first direction.

The bonding unit is disposed between the multi-layer unit and the side margin, the bonding unit having a maximum dimension in the first direction and being made of an oxide including the base metal material, the maximum dimension being equal to or larger than 50% of an average dimension of the ceramic layers in the first direction.

During sintering of the multi-layer ceramic capacitor, the internal electrodes made of the base metal material start to be sintered at a temperature of several hundred degrees (° C.) and contract in a second direction accordingly. Meanwhile, at the stage at the temperature of several hundred degrees (° C.), the ceramic layers and side margins made of ceramics are unsintered and do not contract. Such a configuration causes stress between the multi-layer unit including the internal electrodes and the side margin in a direction moving away from each other.

Meanwhile, the bonding unit starts to be generated as an oxide containing the base metal material at the temperature of several hundred degrees (° C.), at which the internal electrodes start to be sintered. The bonding unit has a higher strength than that of the unsintered ceramics. For that reason, providing the bonding unit between the multi-layer unit and the side margin can provide a configuration having a higher strength in the bonded interface therebetween, in which stress occurs, and can exert resistance properties to the stress.

Further, a bonding strength in the bonding between the base metal material, which is changed into an oxide, and the ceramics is higher than a bonding strength in the bonding between the ceramic layer and the side margin, which are unsintered ceramics. As a result, a bonding strength between the multi-layer unit and the side margin can be enhanced by the bonding unit, and a crack or peel-off in the bonded interface can be inhibited from being generated even if the stress occurs.

Furthermore, the bonding unit has the maximum dimension in the first direction, the maximum dimension being equal to or larger than 50% of an average dimension of the ceramic layers in the first direction. This configuration allows a region made of an oxide to be provided so as to extend in the first direction in the bonded interface of the side margin, so that the area of the oxide region in the bonded interface can be sufficiently secured. Therefore, it is possible to sufficiently exert the action and effect described above and to effectively inhibit a crack or peel-off from being generated in the bonded interface.

The bonding unit may include a plurality of segments each made of the oxide, and at least one of the segments may have a maximum dimension in the first direction, the maximum dimension being equal to or larger than 50% of the average dimension of the ceramic layers in the first direction.

The bonding unit includes the segments, so that the area of the bonding unit in the bonded interface of the side margin can be further increased.

The bonding unit may be disposed apart from at least one of internal electrodes adjacent to each other in the internal electrodes.

This configuration allows a short circuit due to contact with the internal electrodes to be inhibited from occurring even if the oxidation of the bonding unit is insufficient.

The average dimension of the ceramic layers in the first direction may be equal to or smaller than 0.5 μm.

In general, as the dimension (thickness) of the ceramic layer in the first direction becomes smaller, the thickness of the internal electrode relatively becomes thicker, and larger stress occurs at the time of sintering. Also in this case, providing the bonding unit can effectively inhibit a crack or peel-off in the bonded interface from being generated.

The base metal material may be nickel.

Further, the oxide may contain magnesium.

This configuration allows the oxide to be formed more stably, can enhance insulation properties of the bonding unit, and can inhibit a short circuit due to contact with the internal electrodes from occurring.

Furthermore, each of the internal electrodes may include an oxidized electrode region, the oxidized electrode region being formed at an end portion in the second direction and being made of the oxide.

This configuration allows the region made of an oxide to extend in the third direction intersecting with the first direction in the bonded interface of the side margin. Therefore, it is possible to further increase the area of the oxide region and effectively inhibit a crack or peel-off from being generated.

According to another embodiment of the present disclosure, there is provided a method of producing a multi-layer ceramic capacitor, the method including: preparing a multi-layer sheet including ceramic sheets that are laminated in a first direction, and internal electrodes that are disposed between the ceramic sheets and include a base metal material as a main component; cutting the multi-layer sheet to produce a multi-layer chip having a side surface, end portions of the internal electrodes being exposed to the side surface, the side surface including a stretched portion obtained when an end portion of at least one of the internal electrodes is stretched in the first direction; providing a side margin to the side surface of the multi-layer chip to produce a ceramic body; and sintering the ceramic body and oxidizing the stretched portion to form a bonding unit having a maximum dimension in the first direction, the maximum dimension being equal to or larger than 50% of an average dimension of ceramic layers in the first direction, the ceramic layers being obtained when the ceramic sheets are sintered.

In the configuration described above, the internal electrodes are stretched in the cutting step, and the stretched portions are oxidized in the sintering step, with the result that a ceramic capacitor including the bonding unit can be easily produced.

As described above, according to the embodiments of the present disclosure, it is possible to provide a multi-layer ceramic capacitor and a method producing the same, which are capable of inhibiting a crack or peel-off from being generated in a bonded interface of a side margin.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, embodiments of the present disclosure will be described with reference to the drawings.

In the figures, an X axis, a Y axis, and a Z axis orthogonal to one another are shown as appropriate. The X axis, the Y axis, and the Z axis are common in all figures.

1. BASIC CONFIGURATION OF MULTI-LAYER CERAMIC CAPACITOR 10

Figure 1:
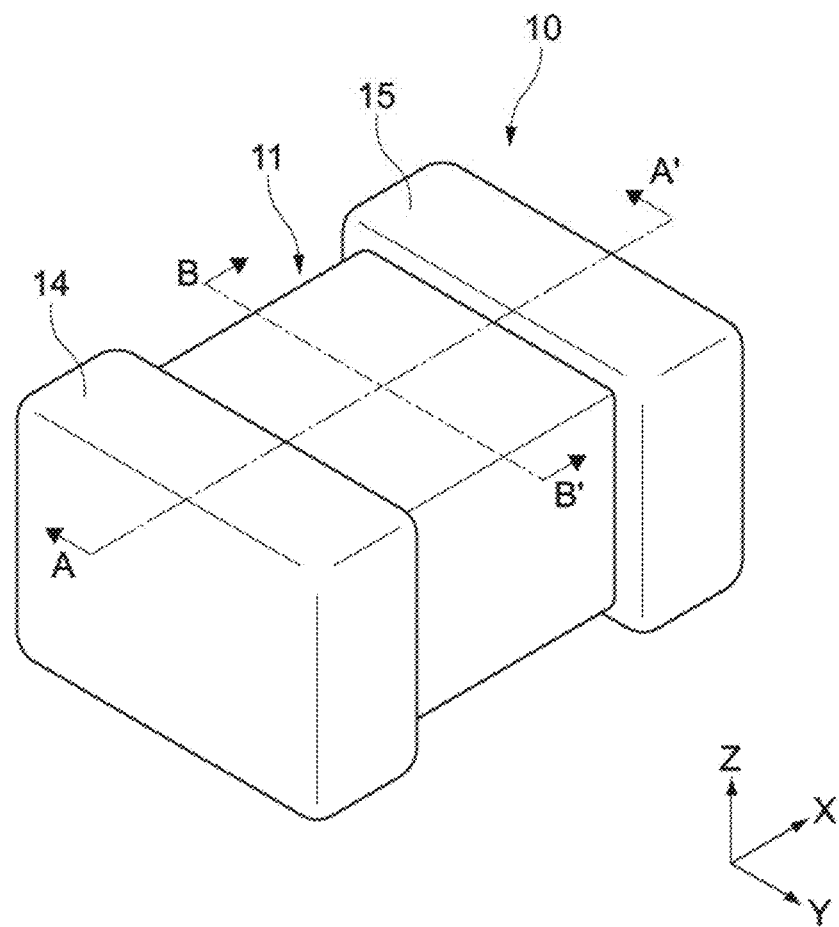
FIG. 1 is a perspective view of a multi-layer ceramic capacitor according to one embodiment of the present disclosure.
Figure 2:
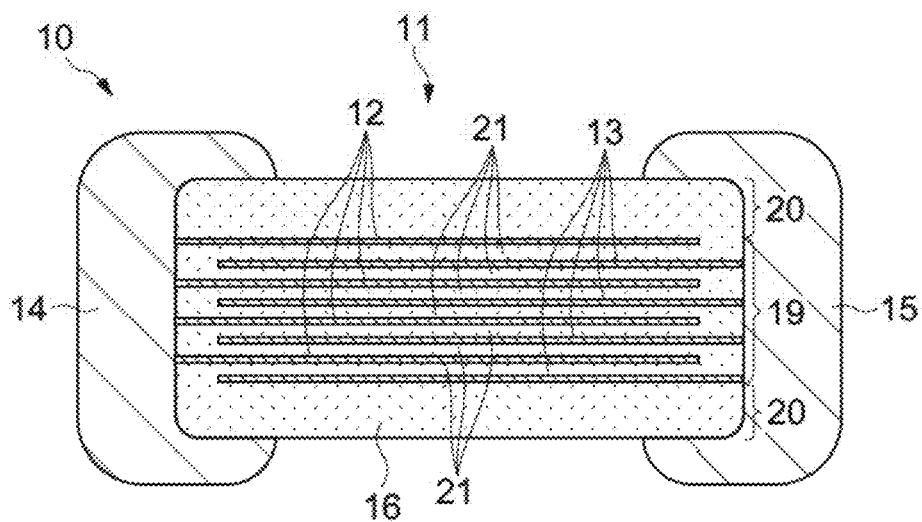
FIG. 2 is a cross-sectional view of the multi-layer ceramic capacitor taken along the A-A' line in FIG. 1.
Figure 3:
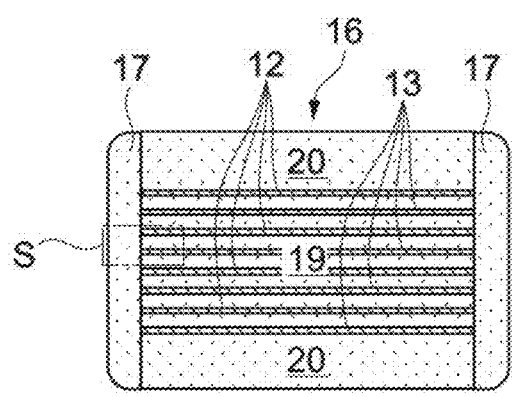
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 has two end surfaces facing in an X-axis direction, two side surfaces facing in a Y-axis direction, and two main surfaces facing in a Z-axis direction. Ridges connecting the respective surfaces of the ceramic body 11 are chamfered.

It should be noted that the form of the ceramic body 11 is not limited to the form as described above. In other words, the ceramic body 11 does not need to have the rectangular form as shown in FIGS. 1 to 3. For example, the surfaces of the ceramic body 11 may be curved surfaces, and the ceramic body 11 may be rounded as a whole.

The first external electrode 14 and the second external electrode 15 cover both the end surfaces of the ceramic body 11 that face in the X-axis direction, and extend to the four surfaces (two main surfaces and two side surfaces) that are connected to both the end surfaces facing in the X-axis direction. With this configuration, both of the first external electrode 14 and the second external electrode 15 have U-shaped cross sections in parallel with an X-Z plane and an X-Y plane.

The ceramic body 11 includes a multi-layer unit 16 and side margins 17. The side margins 17 cover the entire side surfaces of the multi-layer unit 16, the side surfaces facing in the Y-axis direction.

The multi-layer unit 16 includes a capacitance forming unit 19 and covers 20. The covers 20 respectively cover the upper and lower surfaces of the capacitance forming unit 19, the upper and lower surfaces facing in the Z-axis direction. The capacitance forming unit 19 includes a plurality of ceramic layers 21, a plurality of first internal electrodes 12, and a plurality of second internal electrodes 13. The covers 20 do not include the first internal electrodes 12 and the second internal electrodes 13.

The first internal electrodes 12 and the second internal electrodes 13 are alternately disposed along the Z-axis direction between the ceramic layers 21 laminated in the Z-axis direction. The first internal electrodes 12 are connected to the first external electrode 14 and are spaced apart from the second external electrode 15. The second internal electrodes 13 are connected to the second external electrode 15 and are spaced apart from the first external electrode 14.

The first and second internal electrodes 12 and 13 are each made of a base metal material as a main component and function as internal electrodes of the multi-layer ceramic capacitor 10. Examples of the base metal material forming the first and second internal electrodes 12 and 13 typically include nickel (Ni), and in addition thereto, copper (Cu).

In such a manner, in the ceramic body 11, except both the end surfaces, which face in the X-axis direction and to which the first external electrode 14 and the second external electrode 15 are provided, the surfaces of the capacitance forming unit 19 are covered with the side margins 17 and the covers 20. The side margins 17 and the covers 20 have main functions of protecting the periphery of the capacitance forming unit 19 and ensuring insulation properties of the first internal electrodes 12 and the second internal electrodes 13.

The ceramic layers 21 disposed between the first internal electrodes 12 and the second internal electrodes 13 in the capacitance forming unit 19 are made of dielectric ceramics. In the multi-layer ceramic capacitor 10, in order to increase the capacitance in the capacitance forming unit 19, dielectric ceramics having a high dielectric constant is used as the dielectric ceramics forming the ceramic layers 21.

More specifically, in the multi-layer ceramic capacitor 10, polycrystal of a barium titanate ($BaTiO_3$) based material, i.e., polycrystal having a Perovskite structure containing barium (Ba) and titanium (Ti) is used as the dielectric ceramics having a high dielectric constant that forms the ceramic layers 21. This provides a large capacitance to the multi-layer ceramic capacitor 10.

It should be noted that the ceramic layers 21 may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The side margins 17 and the covers 20 are also made of dielectric ceramics. Although a material forming the side margins 17 and the covers 20 only needs to be insulating ceramics, use of dielectric ceramics similar to that of the ceramic layers 21 leads to suppression of internal stress in the ceramic body 11.

When a voltage is applied between the first external electrode 14 and the second external electrode 15 in the multi-layer ceramic capacitor 10 having the configuration described above, the voltage is applied to the plurality of ceramic layers 21 between the first internal electrodes 12 and the second internal electrodes 13. This allows the multi-layer ceramic capacitor 10 to store charge corresponding to the voltage applied between the first external electrode 14 and the second external electrode 15.

It should be noted that the basic configuration of the multi-layer ceramic capacitor 10 according to this embodiment is not limited to that shown in FIGS. 1 to 3 and can be changed as appropriate. For example, the number of first internal electrodes 12 and second internal electrodes 13 and the thickness of each ceramic layer 21 can be determined as appropriate according to the size and performance expected for the multi-layer ceramic capacitor 10.

2. DETAILED CONFIGURATION OF MULTI-LAYER CERAMIC CAPACITOR 10

The ceramic body 11 of the multi-layer ceramic capacitor 10 is produced by, for example, bonding unsintered side margins 17 to the side surfaces of an unsintered multi-layer unit 16 and baking them. Since the metal material forming the first and second internal electrodes 12 and 13 and the dielectric ceramics are different in sintering temperature in the sintering step, the stress concentrates on the bonded interface between the multi-layer unit 16 and each side margin 17, which leads to concerns about the occurrence of a crack, peel-off, or the like. Therefore, it is very important to ensure the bonding strength between the multi-layer unit 16 and each side margin 17.

In this regard, the multi-layer ceramic capacitor 10 includes a bonding unit 22 in order to ensure the bonding strength between the multi-layer unit 16 and each side margin 17. Hereinafter, the configuration of the bonding unit 22 will be described with reference to FIGS. 4 and 5.

Figure 4:
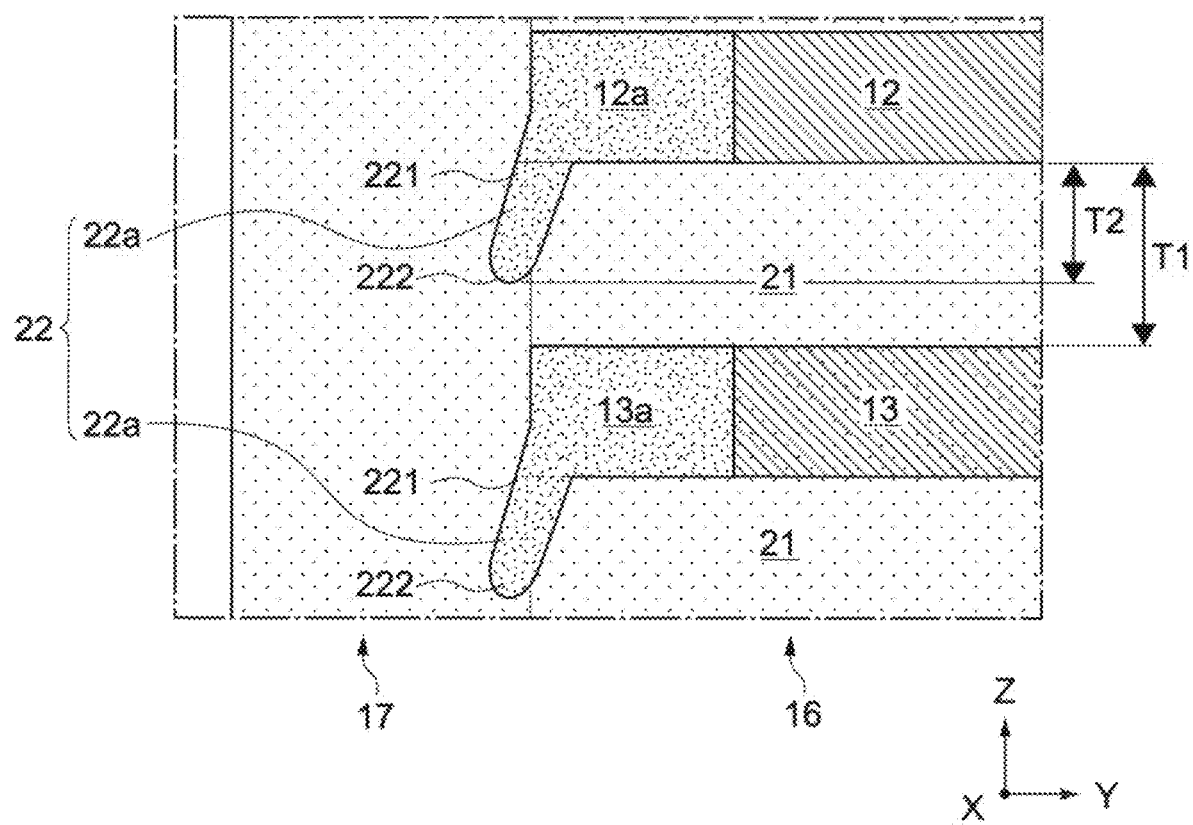
FIG. 4 is a partially enlarged cross-sectional view of a region S of the multi-layer ceramic capacitor shown in FIG. 3.
Figure 5:
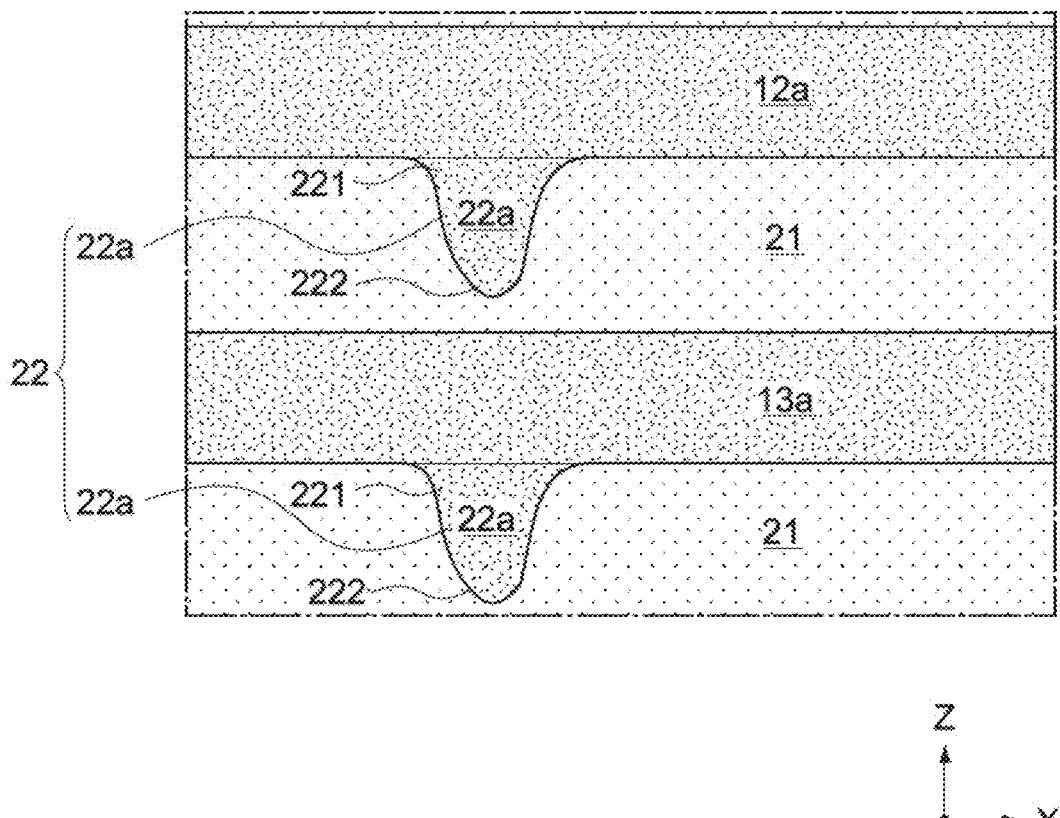
FIG. 5 is a partially enlarged cross-sectional view of a side surface of a multi-layer unit of the multi-layer ceramic capacitor, which is to be bonded to a side margin.

FIG. 4 is a partially enlarged cross-sectional view of a region S of the multi-layer ceramic capacitor 10, which is surrounded by a chain line of FIG. 3. FIG. 5 is a partially enlarged cross-sectional view schematically showing a side surface (side surface facing in the Y-axis direction) of the multi-layer unit 16, which is to be bonded to the side margin 17.

As shown in FIGS. 4 and 5, the bonding unit 22 is disposed between the multi-layer unit 16 and the side margin 17. The bonding unit 22 includes a plurality of segments 22a in this embodiment. The segments 22a in this embodiment are arranged on a straight line substantially parallel to the Z-axis direction. The segments 22a are formed into substantially the same shape, but may also be formed into different shapes.

In this embodiment, the bonding unit 22 is provided to one of the first and second internal electrodes 12 and 13 adjacent to each other and spaced apart from the other one of those first and second internal electrodes 12 and 13, and is configured such that each segment 22a thereof extends from the one of those first and second internal electrodes 12 and 13. In other words, one end portion 221 of the segment 22a is configured to be connected to one of the first and second internal electrodes 12 and 13 and to extend downward in the Z-axis direction from the tip portion of that internal electrode in the Y-axis direction. The other end portion 222 of the bonding unit 22 is spaced apart from the internal electrode. It should be noted that all the segments 22a do not need to extend from one of the first and second internal electrodes 12 and 13 adjacent to each other and, as will be described later, any one of the segments 22a may be spaced apart from the first and second internal electrodes 12 and 13 adjacent to each other. This can inhibit a short circuit due to the bonding unit 22 from occurring between the first and second internal electrodes 12 and 13 even if the bonding unit 22 has insufficient insulation properties.

At least one of the segments 22a of the bonding unit 22 is configured such that the maximum dimension in the Z-axis direction (maximum length T2) is 50% or more and less than 100% of the average dimension (average thickness T1) of the plurality of ceramic layers 21 in the Z-axis direction. The maximum length T2 of the bonding unit 22 means the largest dimension in the dimensions of the respective segments 22a in the Z-axis direction from the end portion 221 to the end portion 222. In other words, the maximum length T2 is the largest dimension of the segment 22a in the Z-axis direction among the plurality of segments 22a. In this embodiment, the end portion 221 of the segment 22a is connected to one of the first and second internal electrodes 12 and 13. In this case, the maximum length T2 means a dimension in the Z-axis direction from the lower end of the internal electrode in the Z-axis direction at the end portion of the internal electrode in the Y-axis direction, to the other end portion 222 of the segment 22a.

It should be noted that the average thickness T1 of the ceramic layers 21 can be calculated as an average value of the thicknesses measured at a plurality of sites of the ceramic layers 21. The position at which the thickness of the ceramic layer 21 is to be measured or the number of positions may be optionally determined. Hereinafter, an example of a method of measuring the average thickness T of the ceramic layers 21 will be described with reference to FIG. 6.

Figure 6:
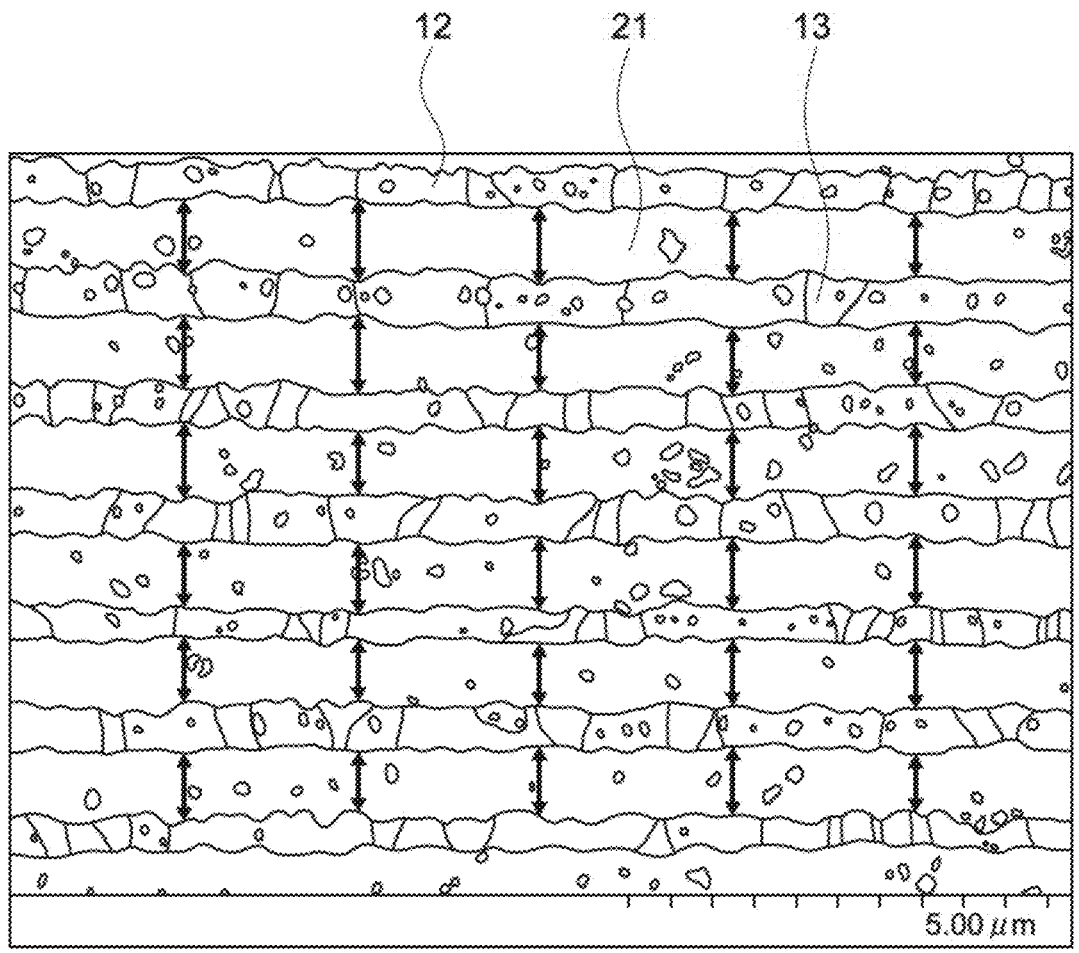
FIG. 6 is a diagram showing a microstructure of a cross section of the multi-layer ceramic capacitor.

FIG. 6 is a diagram showing a microstructure of a cross section of the ceramic body 11, which is observed in the visual field of 12.6 μm×8.35 μm with a scanning electron microscope. For each of the six ceramic layers 21 within the visual field, the thickness is measured at five sites indicated by the arrows arranged at equal intervals of 2 and an average value of the thicknesses obtained at the 30 sites can be obtained as an average thickness T1.

In the multi-layer ceramic capacitor 10, the ceramic layer 21 is configured to be thin. For example, the average thickness T1 of the ceramic layers 21 is equal to or smaller than 0.5 μm. In general, a multi-layer ceramic capacitor including thin ceramic layers is advantageous in terms of increase in capacitance, miniaturization, and reduction in thickness of the multi-layer ceramic capacitor, whereas such a multi-layer ceramic capacitor is likely to cause a crack or peel-off in the side margin. However, in the multi-layer ceramic capacitor 10 including the bonding unit 22, the occurrence of a crack or peel-off can be effectively inhibited, as will be described later, even if the average thickness T1 of the ceramic layers 21 is equal to or smaller than 0.5 μm. According to this embodiment, it is possible to achieve both the effect of the increase in capacitance, miniaturization, and reduction in thickness of the multi-layer ceramic capacitor 10 and the effect of the improvement in yield rate.

The bonding unit 22 is made of an oxide of a base metal material such as nickel, which is a main component of the first and second internal electrodes 12 and 13. The bonding unit 22 has insulation properties. With this configuration, the occurrence of a short circuit due to the bonding unit 22 can be more reliably suppressed even if the average thickness T1 of the ceramic layers 21 is made smaller. Further, the bonding unit 22 may contain magnesium (Mg) in addition to nickel and may be made of a nickel composite oxide containing magnesium.

Furthermore, the first and second internal electrodes 12 and 13 of this embodiment include oxidized electrode regions 12a and 13a, respectively, which have no electrical conductivity and are disposed at an end portion of the multi-layer unit 16 in the Y-axis direction in the vicinity of the side surface of the multi-layer unit 16. The oxidized electrode regions 12a and 13a are made of the same material as that of the bonding unit 22. In other words, the oxidized electrode regions 12a and 13a are made of the oxide of the base metal material such as nickel, which is a main component of the first and second internal electrodes 12 and 13. The oxide may be a nickel composite oxide containing magnesium.

Such a configuration provides the segments 22a of the bonding unit 22 and the oxidized electrode regions 12a and 13a, which are each made of the oxide of the base metal material, in the bonded interface between the multi-layer unit 16 and the side margin 17. In other words, in the bonded interface, the oxidized electrode regions 12a and 13a are each disposed in the form of a laminate, and in addition, the bonding unit 22 extending in the Z-axis direction is disposed. Therefore, the oxidized regions made of the oxide are not localized in the form of a laminate but spread in the Z-X plane.

In other words, providing the bonding unit 22 can increase the area of the oxidized regions in the bonded interface described above, and can also enhance the bonding strength between the multi-layer unit 16 and the side margin 17 in the sintering process of the multi-layer ceramic capacitor 10. Hereinafter, this will be described in detail in "Method of Producing Multi-layer Ceramic Capacitor 10".

3. METHOD OF PRODUCING MULTI-LAYER CERAMIC CAPACITOR 10

Figure 7:
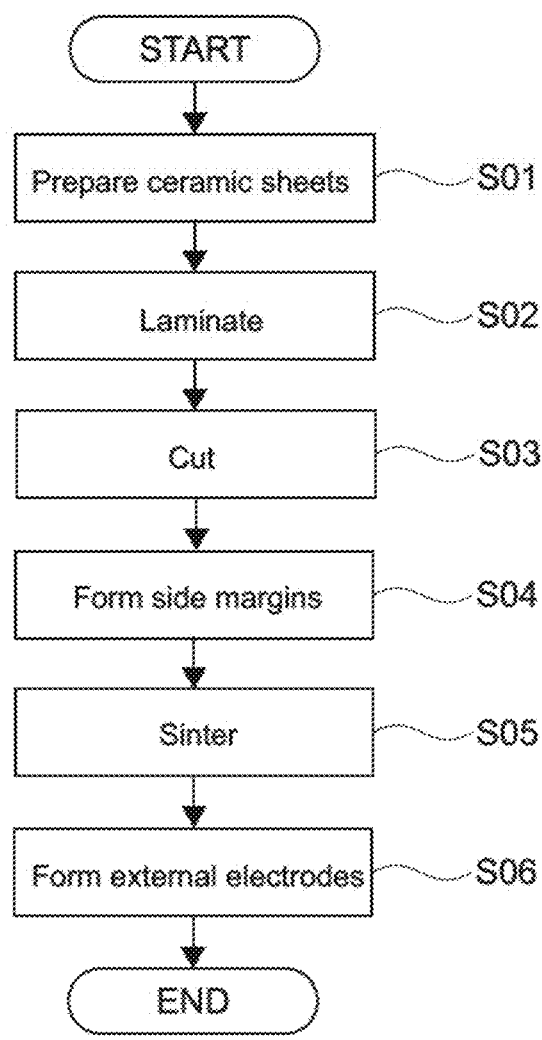
FIG. 7 is a flowchart showing a method of producing the multi-layer ceramic capacitor.
Figure 8:
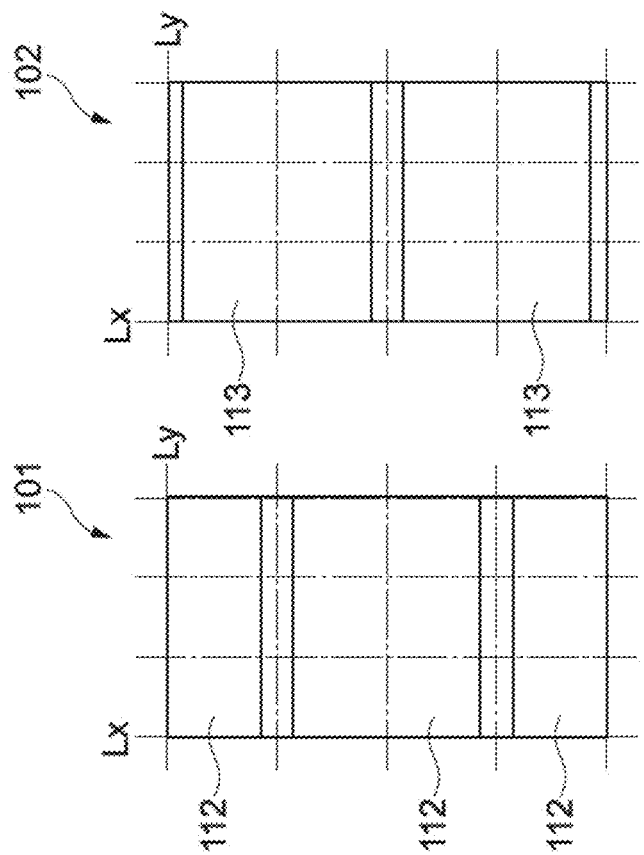
FIGS. 8A, 8B, and 8C are plan views each showing a production process of the multi-layer ceramic capacitor.

FIG. 7 is a flowchart showing a method of producing the multi-layer ceramic capacitor 10. FIGS. 8A to 14 are views each showing a production process of the multi-layer ceramic capacitor 10. Hereinafter, the method of producing the multi-layer ceramic capacitor 10 will be described according to FIG. 7 with reference to FIGS. 8A to 14 as appropriate.

3.1 Step S01: Preparation of Ceramic Sheets

In Step S01, first ceramic sheets 101 and second ceramic sheets 102 for forming the capacitance forming unit 19, and third ceramic sheets 103 for forming the covers 20 are prepared. The first, second, and third ceramic sheets 101, 102, and 103 are formed as unsintered dielectric green sheets mainly containing dielectric ceramics.

The first, second, and third ceramic sheets 101, 102, and 103 are formed into sheets by using a roll coater or a doctor blade, for example. The thickness of each of the first and second ceramic sheets 101 and 102 is adjusted such that the average thickness T1 of the ceramic layers 21 in a sintered capacitance forming unit 19 becomes equal to or smaller than 0.5 μm. The thickness of the third ceramic sheet 103 can be adjusted as appropriate.

FIGS. 8A, 8B, and 8C are plan views of the first, second, and third ceramic sheets 101, 102, and 103, respectively. At this stage, the first, second, and third ceramic sheets 101, 102, and 103 are each formed into a large-sized sheet that is not singulated. FIGS. 8A, 8B, and 8C each show cutting lines Lx and Ly to be used when the sheets are singulated into the multi-layer ceramic capacitors 10. The cutting lines Lx are parallel to the X axis, and the cutting lines Ly are parallel to the Y axis.

As shown in FIGS. 8A, 8B, and 8C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheets 103 corresponding to the covers 20.

The first and second internal electrodes 112 and 113 can be formed by applying an optional electrically conductive paste to the first and second ceramic sheets 101 and 102. A method of applying an electrically conductive paste can be optionally selected from well-known techniques. For example, for the application of an electrically conductive paste, a screen printing method or a gravure printing method can be used.

In the first and second internal electrodes 112 and 113, gaps are disposed in the X-axis direction along the cutting lines Ly for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

3.2 Step S02: Lamination

Figure 9:
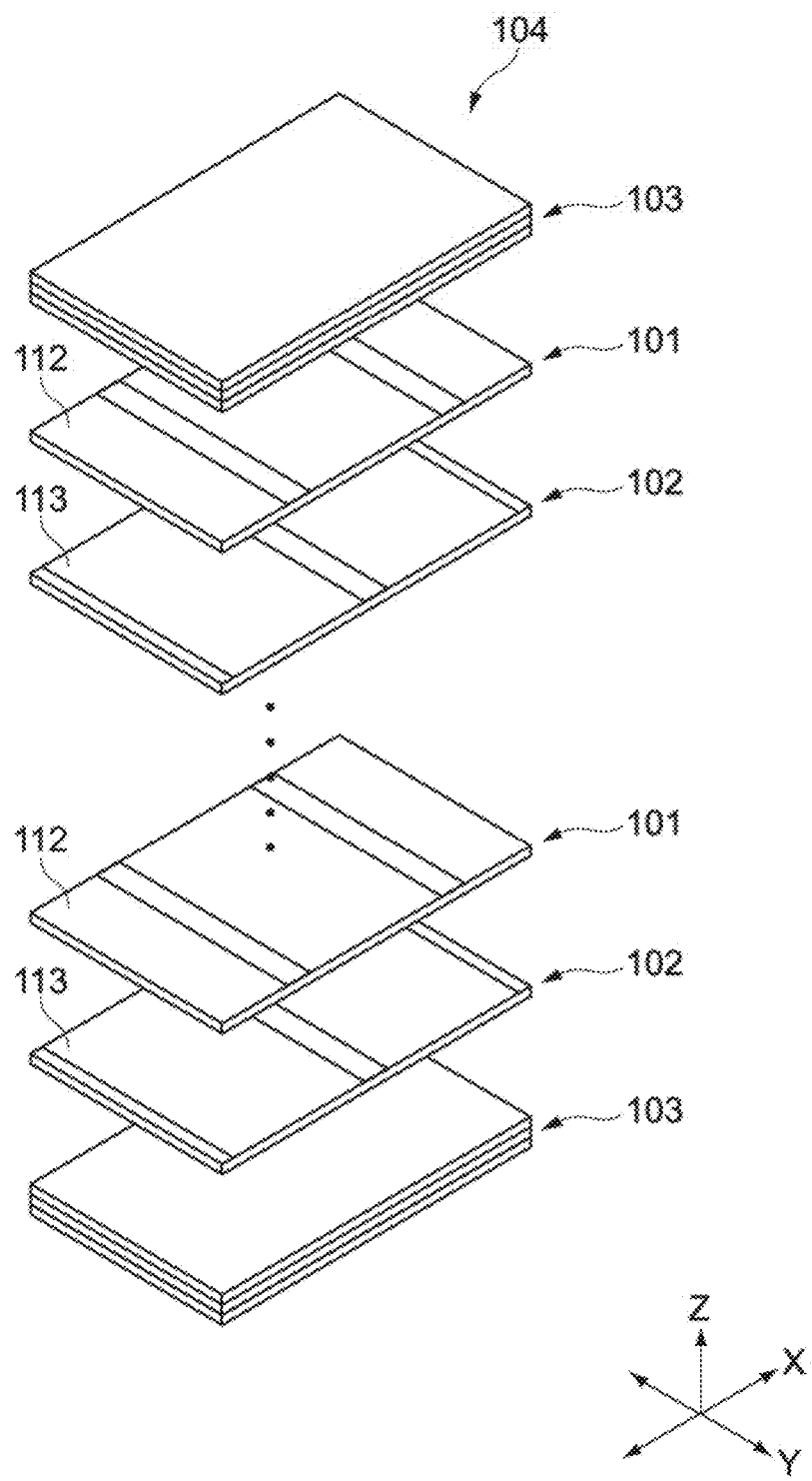
FIG. 9 is a perspective view showing a production process of the multi-layer ceramic capacitor.

In Step S02, the first, second, and third ceramic sheets 101, 102, and 103 prepared in Step S01 are laminated as shown in FIG. 9, to produce a multi-layer sheet 104. In the multi-layer sheet 104, the first ceramic sheets 101 and the second ceramic sheets 102 that correspond to the capacitance forming unit 19 are alternately laminated in the Z-axis direction.

Further, in the multi-layer sheet 104, the third ceramic sheets 103 corresponding to the covers 20 are laminated on the uppermost and lowermost surfaces of the laminate including the first and second ceramic sheets 101 and 102 alternately laminated in the Z-axis direction. It should be noted that, in the example shown in FIG. 9, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is desirably used. This makes it possible to obtain a high-density multi-layer sheet 104.

3.3 Step S03: Cutting

Figure 10:
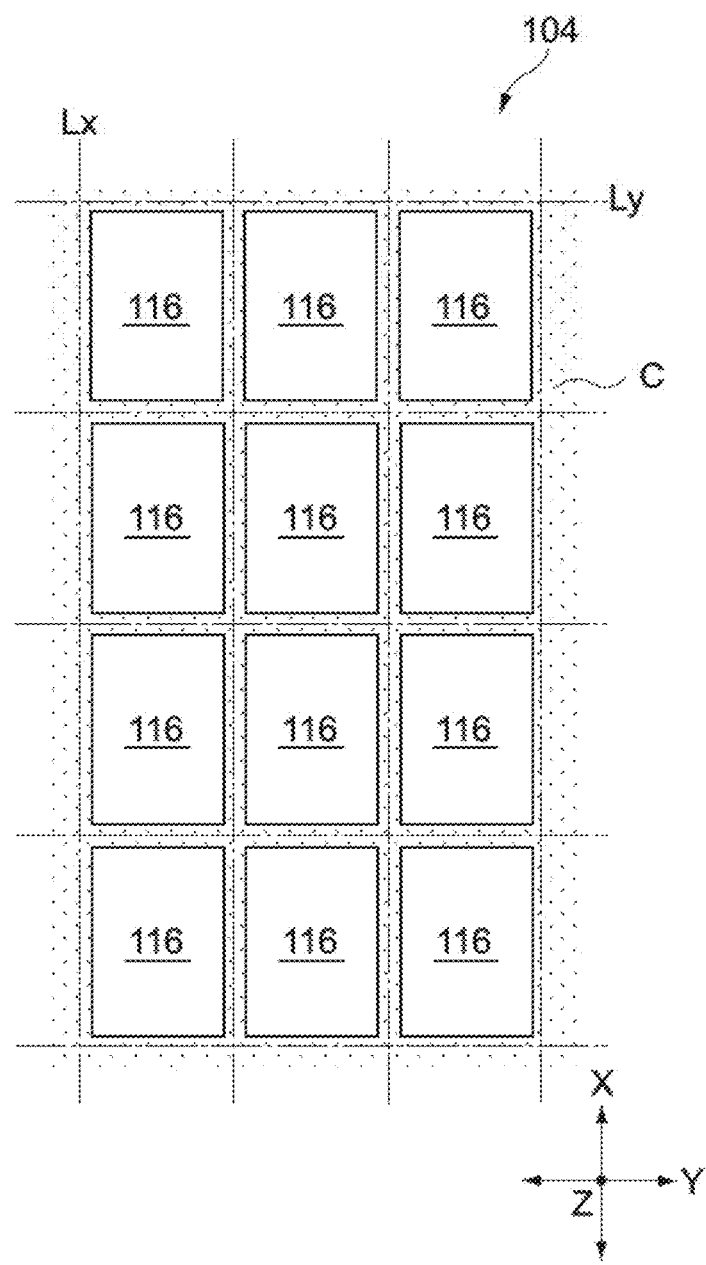
FIG. 10 is a plan view showing a production process of the multi-layer ceramic capacitor.

In Step S03, the multi-layer sheet 104 obtained in Step S02 is cut along the cutting lines Lx and Ly as shown in FIG. 10, to produce unsintered multi-layer chips 116. Each of the multi-layer chips 116 corresponds to a multi-layer unit 16 after sintering. The multi-layer sheet 104 is cut with a rotary blade, a push-cutting blade, or the like.

More specifically, the multi-layer sheet 104 is cut along the cutting lines Lx and Ly while being held by a holding member C. Thus, the multi-layer sheet 104 is singulated, so that the multi-layer chips 116 are obtained. At that time, the holding member C is not cut, and thus the multi-layer chips 116 are connected via the holding member C.

Figure 11A:
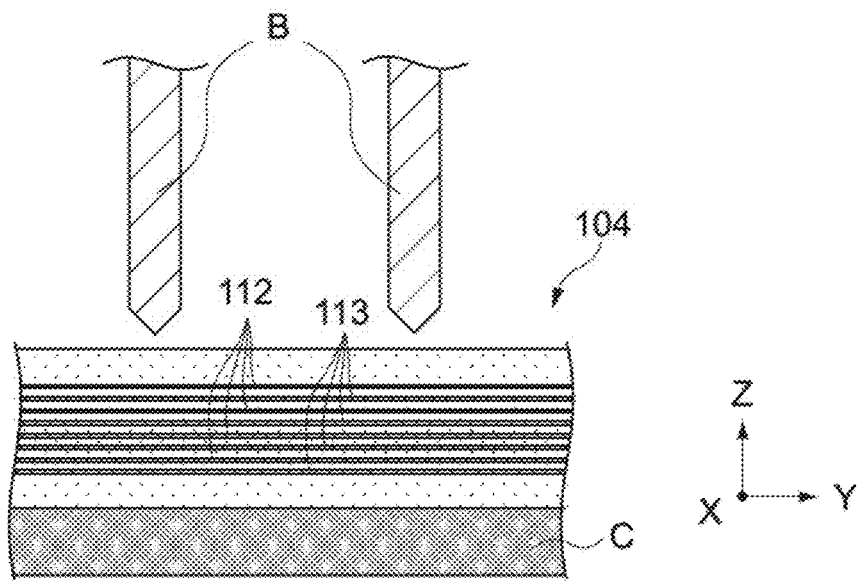
FIGS. 11A, 11B, and 11C are cross-sectional views each showing a production process of the multi-layer ceramic capacitor.
Figure 11B:
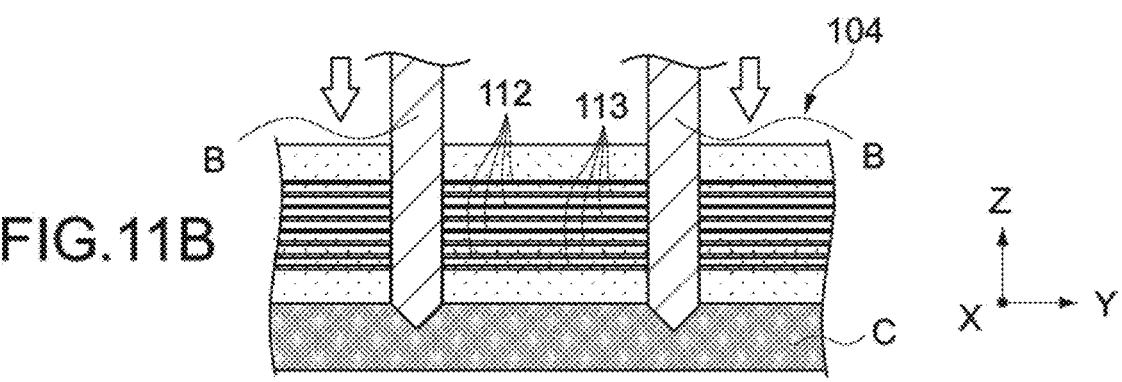
Figure 11C:
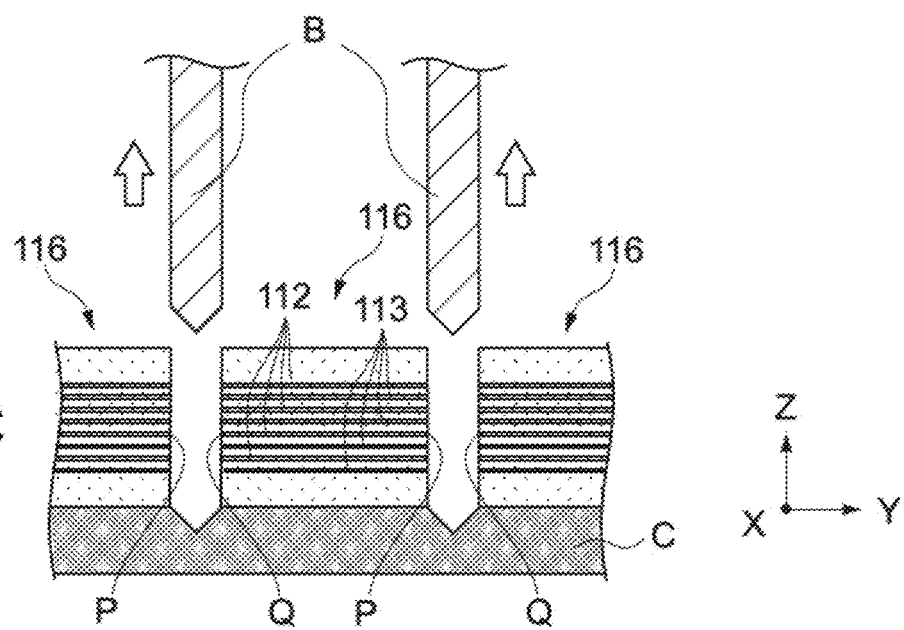

FIGS. 11A, 11B, and 11C are cross-sectional views of the multi-layer sheet 104 showing the process of Step S03. An example in which the multi-layer sheet 104 is cut with a cutting device including a push-cutting blade B will be described here.

As shown in FIG. 11A, the push-cutting blade B facing downward in the Z-axis direction is first disposed above the multi-layer sheet 104 in the Z-axis direction.

Next, as shown in FIG. 11B, the push-cutting blade B is moved downward in the Z-axis direction until the push-cutting blade B reaches the holding member C, so that the multi-layer sheet 104 is cut. At that time, the push-cutting blade B does not penetrate the holding member C such that the holding member C is not cut.

Subsequently, as shown in FIG. 11C, the push-cutting blade B is moved upward in the Z-axis direction and pulled out of the multi-layer sheet 104.

Thus, the multi-layer sheet 104 is singulated into a plurality of multi-layer chips 116. At that time, the holding member C is not cut and connects the multi-layer chips 116. This makes it possible to collectively handle the plurality of multi-layer chips 116 in subsequent steps and to improve production efficiency.

Figure 12:
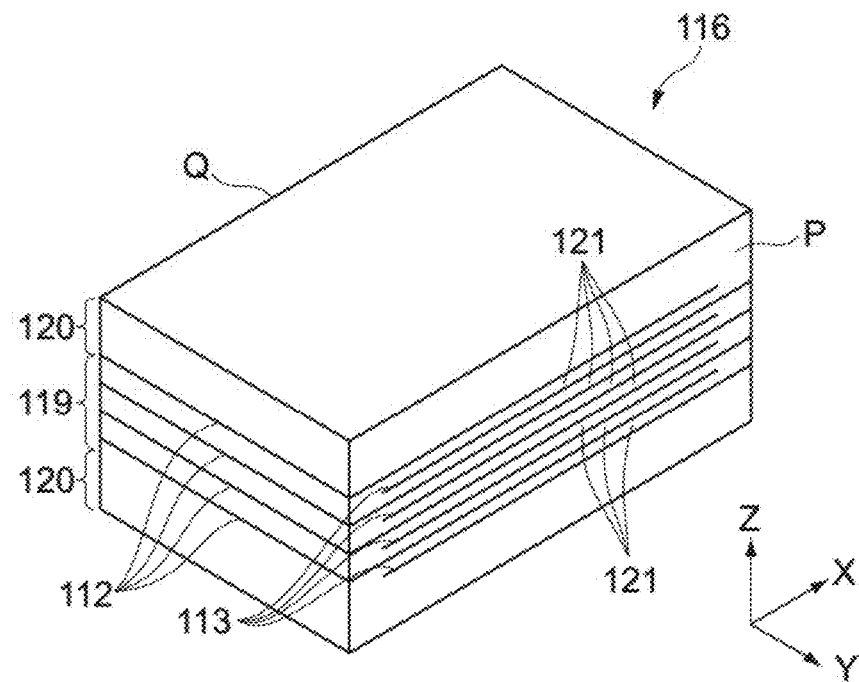
FIG. 12 is a perspective view showing a production process of the multi-layer ceramic capacitor.

FIG. 12 is a perspective view of the multi-layer chip 116 obtained in Step S03. The multi-layer chip 116 includes a capacitance forming unit 119 and covers 120. In the multi-layer chip 116, end portions of the first and second internal electrodes 112 and 113 are exposed to the cut surfaces, i.e., both side surfaces P and Q. Ceramic layers 121 are formed between the first and second internal electrodes 112 and 113.

Figure 13:
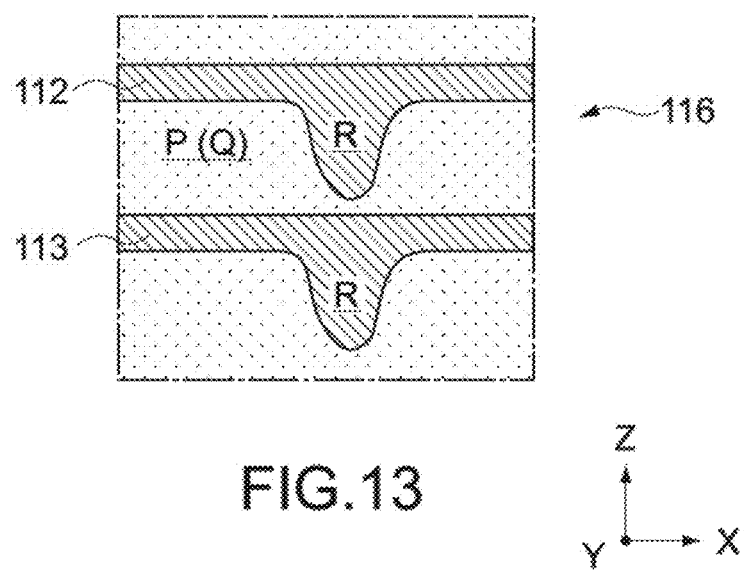
FIG. 13 is an enlarged side surface view showing a production process of the multi-layer ceramic capacitor.

FIG. 13 is an enlarged side surface view showing as an example the side surface P or Q of the multi-layer chip 116 obtained immediately after Step S03.

The side surface P or Q shown in FIG. 13 includes stretched portions R, which are formed when the end portions of the first and second internal electrodes 112 and 113 are stretched in the Z-axis direction, i.e., in a push-cutting direction of the push-cutting blade B in Step S03. The stretched portion R is formed when, for example, a downward force in the Z-axis direction is applied from the push-cutting blade B to the side surface P or Q, and the end portions of the first and second internal electrodes 112 and 113 are deformed downward in the Z-axis direction. At that time, adjustment of the angle or shape of the blade edge of the push-cutting blade B enables the shape of the stretched portion R to be controlled. More specifically, if the angle of the blade edge is made larger, the stretched portion R in the Z-axis direction can be made longer, and if the blade edge includes irregularities, the length of the stretched portion R in the Z-axis direction can be partially made different.

It should be noted that the method of forming the stretched portion R is not limited to the above methods. The stretched portion R may be formed by performing surface treatment on the side surfaces P and Q after the cutting or may be formed by a method of providing a member containing a base metal material forming the first and second internal electrodes 112 and 113, for example.

The stretched portion R is to be oxidized in Step S05 (sintering), which will be described later, and becomes a bonding unit 22. Such a configuration ensures insulation properties in the side surfaces of the multi-layer unit 16, so that a short circuit does not occur in the first and second internal electrodes 12 and 13 after sintering.

3.4 Step S04: Formation of Side Margins

Figure 14:
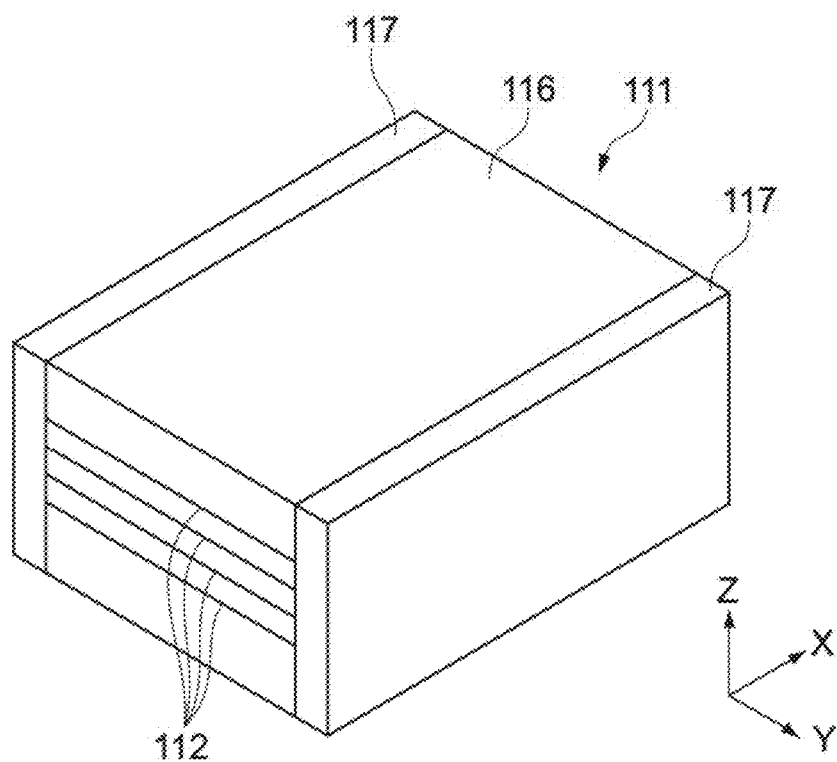
FIG. 14 is a perspective view showing a production process of the multi-layer ceramic capacitor.

In Step S04, unsintered side margins 117 are provided to the side surfaces of the multi-layer chip 116 obtained in Step S03, from which the first and second internal electrodes 112 and 113 are exposed, and an unsintered ceramic body 111 shown in FIG. 14 is thus produced. The side margins 117 are made of ceramic sheets or ceramic slurry.

In Step S04, the side margins 117 are provided to both the side surfaces P and Q that are the cut surfaces of the multi-layer chip 116 in Step S03. In Step S04, it is desirable to previously detach the multi-layer chips 116 from the holding member C and rotate the multi-layer chips 116 by 90 degrees.

The side margins 117 can be formed by, for example, attaching ceramic sheets to the side surfaces P and Q of the multi-layer chip 116. Alternately, the side margins 117 can also be formed by coating the side surfaces P and Q of the multi-layer chip 116 with ceramic slurry by application or dipping, for example.

3.5 Step S05: Sintering

In Step S05, the unsintered ceramic body 111 obtained in Step S04 is sintered to produce the ceramic body 11 of the multi-layer ceramic capacitor 10 shown in FIGS. 1 to 3. In other words, in Step S05, the multi-layer chip 116 becomes the multi-layer unit 16, and the side margins 117 become the side margins 17.

A sintering temperature in Step S05 can be determined on the basis of a sintering temperature of the ceramic body 111. For example, when a barium titanate based material is used as dielectric ceramics, the sintering temperature can be set to approximately 1,000 to 1,300° C. Further, sintering can be performed in a reduction atmosphere or a low-oxygen partial pressure atmosphere, for example.

At the time of sintering, sintering behavior is different between the multi-layer chip 116 and the side margins 117. Thus, stress is applied from the side margins 117 to the side surfaces P and Q of the multi-layer chip 116. More specifically, first, the first and second internal electrodes 112 and 113 made of the base metal material start to be sintered at a temperature of several hundred degrees (° C.). This sintering involves contraction of the first and second internal electrodes 112 and 113 toward the center portions thereof in the Y-axis direction. Meanwhile, the side margins 117 and the ceramic layers 121 made of ceramics having a high sintering temperature are in the unsintered state at the temperature of several hundred degrees (° C.) and do not contract. Such a configuration causes stress in a direction moving away from each other in the Y-axis direction in the bonded interface between each of the side surfaces P and Q of the multi-layer chip 116 and the side margin 117.

In the sintering step of this embodiment, oxygen is supplied from the outside of the ceramic body 111 to the end portions of the first and second internal electrodes 112 and 113 in the Y-axis direction. As a result, oxides containing the base metal material forming the first and second internal electrodes 112 and 113 are generated in the end portions of the first and second internal electrodes 112 and 113 including the stretched portions R. Therefore, the bonding unit 22 and the oxidized electrode regions 12a and 13a are formed. The bonding unit 22 and the oxidized electrode regions 12a and 13a start to be generated as oxides containing the base metal material at the temperature of several hundred degrees (° C.) at which the internal electrodes start to be sintered.

The bonding unit 22 and the oxidized electrode regions 12a and 13a, each of which is made of an oxide, have a higher strength than that of the unsintered ceramic layers 121 and the side margins 117 under the temperature of several hundred degrees (° C.). In other words, since the bonding unit 22 and the oxidized electrode regions 12a and 13a have higher resistance properties to the stress, the generation of a crack or peel-off in the bonded interface can be suppressed.

Furthermore, in the bonded interface, the oxidized electrode regions 12a and 13a extend in the X-axis direction, and the bonding unit 22 extends in the Z-axis direction. The maximum length T2 of the bonding unit 22 in the Z-axis direction is configured to be equal to or larger than 50% of the average thickness T1 of the ceramic layers 21 after subjected to sintering, so that the area of the oxidized region having a high strength can be sufficiently secured, and the generation of a crack or peel-off in the bonded interface can be effectively suppressed.

At the sintering under the temperature of several hundred degrees (° C.), a bonding strength between the base metal material, which is changed into an oxide, and an unsintered ceramic material is higher than a bonding strength between unsintered ceramic materials. The maximum length T2 of the bonding unit 22 in the Z-axis direction is configured to be equal to or larger than 50% of the average thickness T1 of the ceramic layers 21, so that a bonding strength with respect to an unsintered ceramic material can be enhanced to the extent that a crack or peel-off can be sufficiently inhibited from being generated.

Further, in such a configuration that the average thickness T1 of the ceramic layers 21 is equal to or smaller than 0.5 µm, the thickness of each of the first and second internal electrodes 112 and 113 increases relative to the thickness of the ceramic part of the multi-layer chip 116, and stress to be applied at the time of sintering increases. Also in this case, providing the bonding unit 22 allows sufficient resistance properties to the stress to be ensured and can effectively inhibit a crack or peel-off from being generated.

Furthermore, in order to stably oxidize the bonding unit 22 and the oxidized electrode regions 12a and 13a in the sintering step, the side margins 117, the ceramic layers 121, and the like may contain magnesium. In this configuration, magnesium contained in the side margins 117 and the like is to be supplied to the end portions of the first and second internal electrodes 112 and 113 in the Y-axis direction at the time of sintering. This allows the bonding unit 22 and the oxidized electrode regions 12a and 13a to be formed at the end portions of the first and second internal electrodes 112 and 113 in the Y-axis direction, while nickel takes in magnesium and oxygen. Therefore, it is possible to form the bonding unit 22 and the oxidized electrode regions 12a and 13a that are sufficiently oxidized and have high insulation properties.

3.6 Step S06: Formation of External Electrodes

In Step S06, the first external electrode 14 and the second external electrode 15 are formed on the ceramic body 11 obtained in Step S05, to produce the multi-layer ceramic capacitor 10 shown in FIGS. 1 to 3. In Step S06, for example, base films, intermediate films, and surface films forming the first and second external electrodes 14 and 15 are formed on the end surfaces of the ceramic body 11 in the X-axis direction.

More specifically, in Step S06, first, an unsintered electrode material is applied so as to cover both the end surfaces of the ceramic body 11 in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S06 described above may be performed before Step S05. For example, before Step S05, the unsintered electrode material may be applied to both the end surfaces of the unsintered ceramic body 111 that face in the X-axis direction. As a result, in Step S05, sintering of the unsintered ceramic body 111 and baking of the unsintered electrode material can be simultaneously performed.

4. EXAMPLES AND COMPARATIVE EXAMPLES

For Examples and Comparative examples of this embodiment, samples of the multi-layer ceramic capacitor 10 were produced by the production method described above. In those samples, the dimension in the X-axis direction was set to 1 mm, and the dimensions in the Y- and Z-axis directions were set to 0.5 mm.

In each sample, the stretched states of the internal electrodes in the cross section were controlled by a point angle of the blade edge of the push-cutting blade in the cutting step. Thus, 1000 samples each including the bonding unit having the maximum length equal to or larger than 50% of the average thickness of the ceramic layers were produced for each of Examples 1 to 5. Further, 1000 samples including no bonding unit were produced for each of Comparative examples 1 to 5. The average thickness of the ceramic layers was changed in each of Examples and Comparative examples, i.e., set to 1.0 μm in Example 1 and Comparative example 1, 0.8 μm in Example 2 and Comparative example 2, 0.6 μm in Example 3 and Comparative example 3, 0.5 μm in Example 4 and Comparative example 4, and 0.4 μm in Example 5 and Comparative example 5.

In each sample of Comparative examples, oxidized electrode regions extending in the X-axis direction are formed in the bonded interface of the side margin, and the region made of an oxide is disposed in the form of a laminate (lineally). Meanwhile, in each sample of Examples, the oxidized electrode regions extending in the X-axis direction and the bonding unit extending in the Z-axis direction are formed in the bonded interface, and the region made of an oxide is spread in the Z-X plane.

Figure 15:
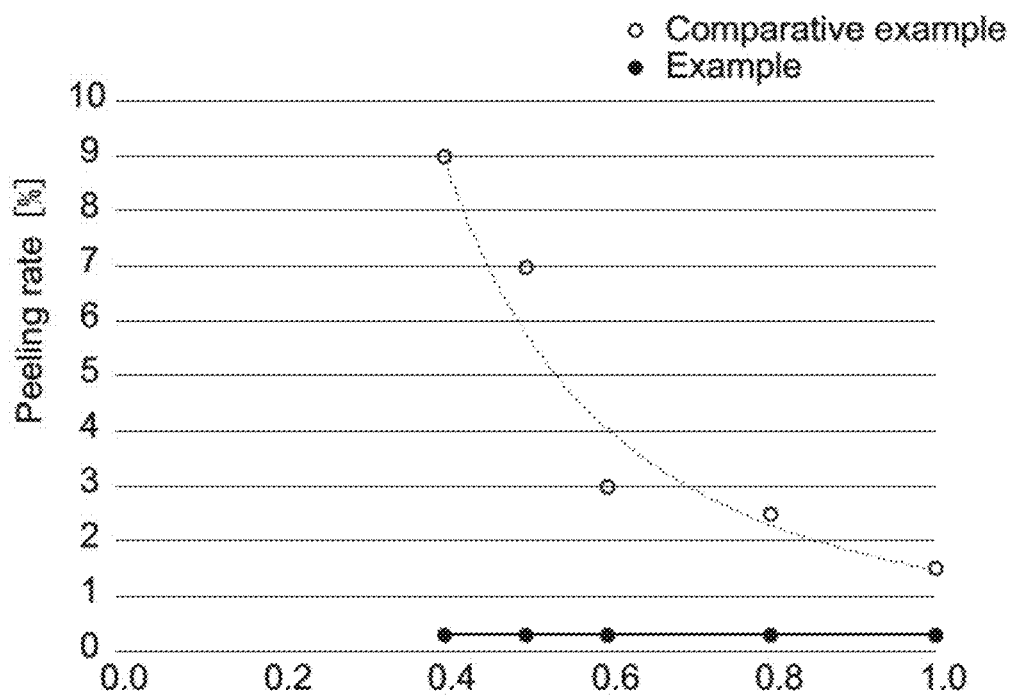
FIG. 15 is a graph showing evaluation results of a peeling rate.

A peeling rate of the side margin of each sample was evaluated. In the evaluation of the peeling rate, whether the side margin of each sample is peeled off or not was visually determined, and the number of samples having peel-off in the 1000 samples was calculated as a peeling rate in each of Examples and Comparative examples. Table 1 and FIG. 15 show results of the evaluation. It should be noted that FIG. 15 is a graph showing evaluation results of the peeling rate, in which the horizontal axis represents the average thickness of the ceramic layers, and the vertical axis represents the peeling rate. In the graph, black circles represent the results of Examples, and white circles represent the results of Comparative examples.

TABLE 1

| Sample | Average thickness of ceramic layers [μm] | Peeling rate[%] |
| --- | --- | --- |
| Comparative example 1 | 1.0 | 1.5 |
| Comparative example 2 | 0.8 | 2.5 |
| Comparative example 3 | 0.6 | 3 |
| Comparative example 4 | 0.5 | 7 |
| Comparative example 5 | 0.4 | 9 |
| Example 1 | 1.0 | 0.3 |
| Example 2 | 0.8 | 0.3 |
| Example 3 | 0.6 | 0.3 |
| Example 4 | 0.5 | 0.3 |
| Example 5 | 0.4 | 0.3 |

As shown in Table 1 and FIG. 15, Examples 1 to 5 each had the peeling rate equal to or smaller than 0.3% independently of the average thickness of the ceramic layers. Meanwhile, Comparative examples 1 to 5 each had the peeling rate of 1% or more, which was significantly higher than that of Examples 1 to 5. Further, the peeling rate was likely to increase as the average thickness of the ceramic layers became smaller, and Comparative examples 4 and 5, in which the average thickness of the ceramic layers was equal to or smaller than 0.5 μm, had the peeling rate of 5% or more. From those results, it was determined that the configurations of Examples of the present disclosure exert a high peeling prevention effect particularly in the configuration in which the average thickness of the ceramic layers is equal to or smaller than 0.5 μm.

5. OTHER EMBODIMENTS

Hereinabove, the embodiment of the present disclosure has been described, but the present disclosure is not limited to the embodiment described above and can be variously modified as a matter of course.

A single segment 22a of the bonding unit 22 may be disposed for a single-layer internal electrode, or a plurality of segments 22a may be disposed therefor. Further, each segment 22a may be disposed on a straight line extending obliquely in the Z-axis direction. Alternatively, each segment 22a may be disposed at random.

The bonding unit 22 is not limited to be spaced apart from one of the first and second internal electrodes 12 and 13 adjacent to each other. If the bonding unit 22 has sufficient insulation properties, the bonding unit 22 may be connected to both of the first and second internal electrodes 12 and 13 adjacent to each other. In this case, the maximum length T2 of the bonding unit 22 may be equal to or larger than 100% of the average thickness T1 of the ceramic layers 21.

The bonding unit 22 is not limited to the example including the plurality of segments 22a and may include a single segment. In this case, the maximum length T2 of the single segment is set to be equal to or larger than 50% of the average thickness T1 of the ceramic layers 21. For example, the bonding unit 22 may include a single long segment extending in the Z-axis direction across the plurality of first and second internal electrodes 12 and 13.

Figure 16:
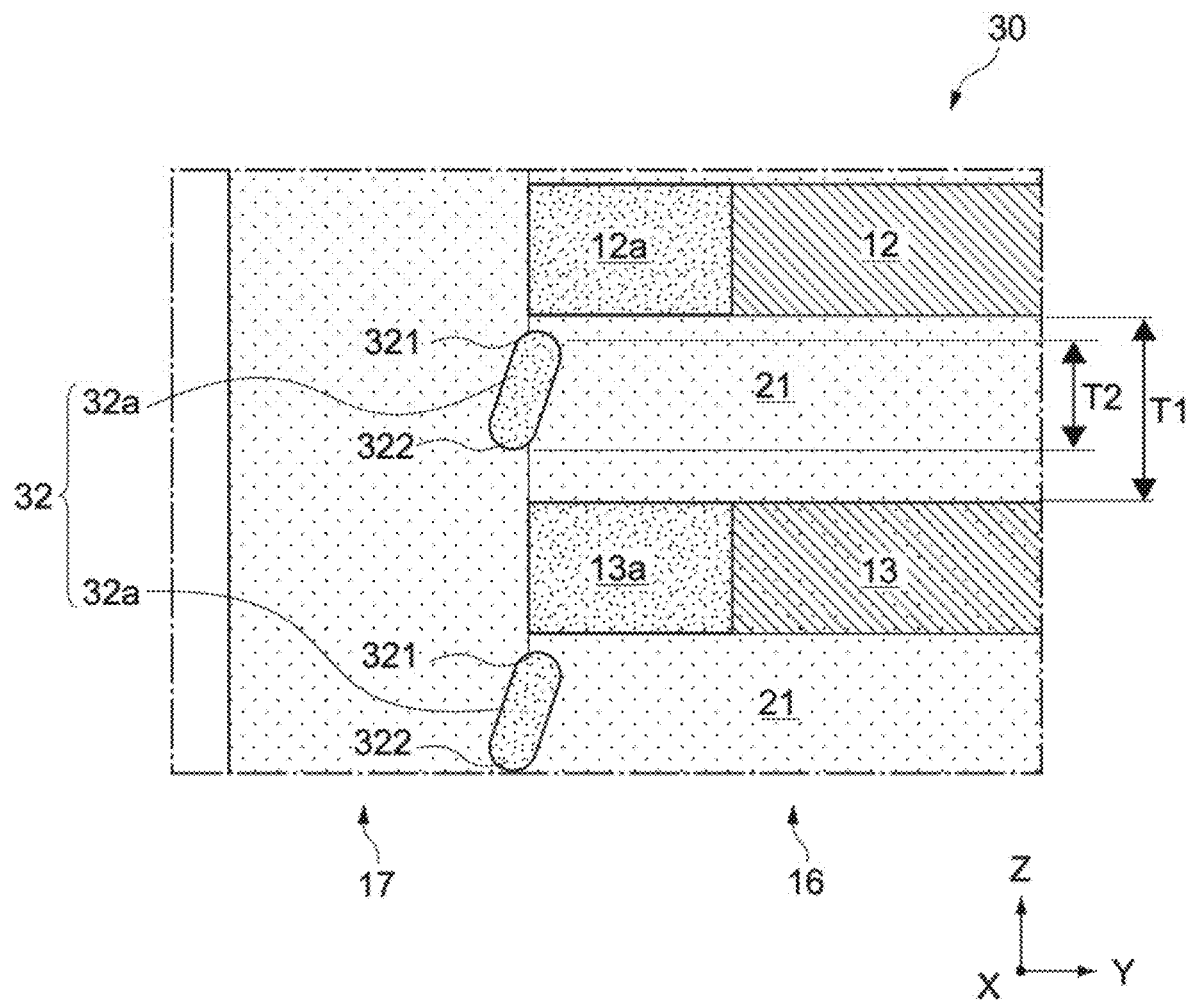
FIG. 16 is a partial cross-sectional view of a multi-layer ceramic capacitor according to another embodiment of the present disclosure.

FIG. 16 is a view showing the configuration of a multi-layer ceramic capacitor 30 according to another embodiment and is a partial cross-sectional view corresponding to FIG. 4. The multi-layer ceramic capacitor 30 includes a bonding unit 32 different from that of the embodiment described above. It should be noted that the configurations other than the bonding unit 32 of the multi-layer ceramic capacitor 30 are similar to those of the embodiment described above and denoted by the same reference symbols, and description thereof will be omitted.

The bonding unit 32 includes a plurality of segments 32a, each of which includes a pair of end portions 321 and 322 facing each other. The bonding unit 32 is spaced apart from both of the first and second internal electrodes 12 and 13 adjacent to each other. In other words, both of the end portions 321 and 322 of the segment 32a are spaced apart from the first and second internal electrodes 12 and 13. Such a configuration can also inhibit peel-off of the side margin 17 and generation of a crack in the bonded interface from occurring even if the maximum length T2 of at least one of the segments 32a is equal to or larger than 50% of the average thickness T1 of the ceramic layers 21.

For example, in the multi-layer ceramic capacitor 10, the capacitance forming unit 19 may be divided into multiple capacitance forming units 19 in the Z-axis direction. In this case, in each capacitance forming unit 19, the first internal electrodes 12 and the second internal electrodes 13 only need to be alternately disposed along the Z-axis direction. In a portion where the capacitance forming units 19 are next to each other, the first internal electrodes 12 or the second internal electrodes 13 may be continuously disposed.

What is claimed is:

1. A multi-layer ceramic capacitor, comprising:
a multi-layer unit including
ceramic layers that are laminated in a first direction, and
internal electrodes that are disposed between the ceramic layers and include a base metal material as a main component;
a side margin that includes ceramics as a main component and covers the multi-layer unit from a second direction orthogonal to the first direction; and
a bonding unit that is disposed between the ceramic layers and the side margin, the bonding unit having a maximum dimension in the first direction and being made of an oxide including the base metal material in common with the internal electrodes, the maximum dimension being equal to or larger than 50% of an average dimension of the ceramic layers in the first direction.

2. The multi-layer ceramic capacitor according to claim 1, wherein
the bonding unit includes a plurality of segments each made of the oxide, and
at least one of the segments has a maximum dimension in the first direction, the maximum dimension being equal to or larger than 50% of the average dimension of the ceramic layers in the first direction.

3. The multi-layer ceramic capacitor according to claim 1, wherein
the bonding unit is disposed apart from at least one of internal electrodes adjacent to each other in the internal electrodes.

4. The multi-layer ceramic capacitor according to claim 1, wherein
the average dimension of the ceramic layers in the first direction is equal to or smaller than 0.5 µm.

5. The multi-layer ceramic capacitor according to claim 1, wherein
the base metal material is nickel.

6. The multi-layer ceramic capacitor according to claim 1, wherein
the oxide contains magnesium.

7. The multi-layer ceramic capacitor according to claim 1, wherein
each of the internal electrodes includes an oxidized electrode region, the oxidized electrode region being formed at an end portion in the second direction and being made of the oxide.

8. A method of producing a multi-layer ceramic capacitor, according to claim 1, comprising: preparing a multi-layer sheet including ceramic sheets that are laminated in a first direction, and internal electrodes that are disposed between the ceramic sheets and include a base metal material as a main component; cutting the multi-layer sheet to produce a multi-layer chip having a side surface, end portions of the internal electrodes being exposed to the side surface, the side surface including a stretched portion obtained when an end portion of at least one of the internal electrodes is stretched in the first direction; providing a side margin to the side surface of the multi-layer chip to produce a ceramic body; and sintering the ceramic body and oxidizing the stretched portion to form a bonding unit having a maximum dimension in the first direction, the maximum dimension being equal to or larger than 50% of an average dimension of ceramic layers in the first direction, the ceramic layers being obtained when the ceramic sheets are sintered.

* * * * *